United States Patent Office 3,705,121
Patented Dec. 5, 1972

3,705,121
FLAVORING AND FRAGRANCE COMPOSITIONS
Alan O. Pittett, Atlantic Highlands, and Ranya Muralidhara, Matawan, N.J., assignors to International Flavors and Fragrances, Inc.
No Drawing. Filed Sept. 25, 1970, Ser. No. 75,782
Int. Cl. C07d 51/76
U.S. Cl. 260—250 R
3 Claims

ABSTRACT OF THE DISCLOSURE

Processes for altering the flavors and aromas of consumable products, including foodstuffs and tobaccos, which comprise adding thereto a small but effective amount of at least one tricyclic pyrazine having the formula

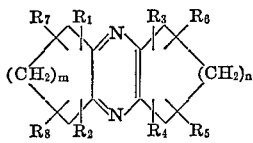

wherein $m$ and $n$ are each an integer from 1 to 6, and $R_1$, $R_2$, $R_3$, $R_4$, $R_5$, $R_6$, $R_7$, and $R_8$, are the same or different and represent hydrogen or alkyl; the products so produced; flavoring and fragrance compositions containing such tricyclic pyrazines; and certain novel pyrazines and processes for their production.

BACKGROUND OF THE INVENTION

The present invention relates to tricyclic pyrazines and their use in processes and compositions for altering the flavors and aromas of various materials such as tobaccos, foodstuffs, and the like, as well as certain novel pyrazines and processes for producing them.

Because of the tremendous consumption of foods, tobaccos, and other materials, there has been an increasing interest in substances and methods for imparting flavors to such consumable materials. This interest has been stimulated not only because of the inadequate quantity of natural flavoring materials available, but perhaps even more importantly, because of the need for materials which can convey certain nuances, will be more stable than natural materials, will blend better with other flavors or flavoring composition components, and will generally provide superior products.

There have recently been suggestions that certain pyrazine derivatives have flavors which might be useful in foods and other consumable materials. For example, tetramethylpyrazine has been suggested for use with vanillin in chocolate flavors, acetylpyrazine has been used in tobacco and foods, and methoxypyrazine has been said to impart a nut-like flavor to foods. Pyrazino-[b]cyclopentanes have also been suggested.

THE INVENTION

It has now been found that certain tricyclic pyrazines are capable of imparting a wide variety of flavors and fragrances to various consumable materials. Briefly, the invention contemplates altering the flavors and/or fragrances of such consumable materials by adding thereto a small but effective amount of at least one tricyclic pyrazine having the formula

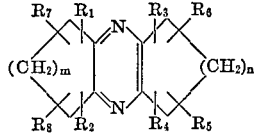

wherein $m$ and $n$ are each an integer from 1 to 6, inclusive; and $R_1$, $R_2$, $R_3$, $R_4$, $R_5$, $R_6$, $R_7$ and $R_8$ represent hydrogen or alkyl and are the same or different. The invention also contemplates flavoring and fragrance compositions containing such tricyclic pyrazines.

More specifically, the tricyclic pyrazines according to this invention are pyrazines to the b and e sides of which are fused five- to ten-membered hydrocrabon rings. Such rings can be substituted with one or more alkyl groups. In some instances one or the other of the rings can be substituted with an alkadienyl group. It will be appreciated from the present disclosure by those skilled in the art that one or more pairs of the alkyl groups substituent on the hydrocarbon ring can be geminal, i.e., can be attached to the same ring carbon atom. It is generally preferred in practicing the present invention that the substituents be hydrogen or a lower alkyl group, particularly one having from one to three carbon atoms.

A tricyclic pyrazine for use herein is 1,2,3,4,5,6,7,8,9,-octahydrophenazine having the formula

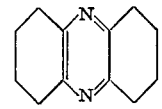

This yellowish viscous liquid has fried corn chip odor and flavor characteristics, as further described hereinafter.

Another tricyclic pyrazine according to this invention is 1-methyl-2,3,5,6,7,8 - hexahydro-1(H)-cyclopenta-[b] quinoxaline having the formula

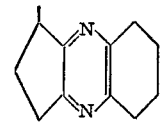

This substance is a pale yellowish liquid having a nut-like aroma.

A further tricyclic pyrazine used herein is the novel material 1,2,3,4,6,7,8,9,10,11,12,13-dodecahydrocyclodeca[b] quinoxaline having the formula

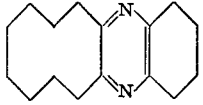

This oily material has a light, sweet nut flavor and aroma character.

The following intermediates are particularly useful in the preparation of the various tricyclic pyrazines:

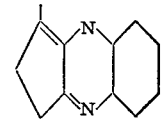

1-methyl - 3,4a,5,6,7,8,8a,9 - octahydro-2(H)-cycloepnta-[b]quinoxaline;

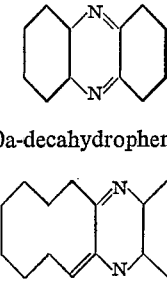

1,2,3,4,4a,6,7,8,9,10a-decahydrophenazine;

1,2,3,4,4a,5,7,8,9,10,11,12,13,14a - tetradecahydrocyclodeca[b]quinoxaline;

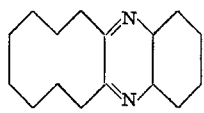

1,2,3,4,4a,6,7,8,9,10,11,12,13,14a - tetradecahydrocyclodeca[b]quinoxaline; and 1,2,3,4,4a,6,7,8,9,9a-decahydrophenazine:

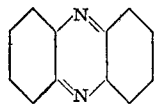

It will accordingly be appreciated that the present invention also provides novel asymmetric tricyclic pyrazines having the formula

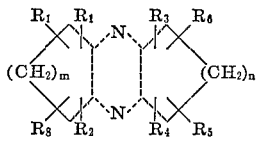

wherein $m$ and $n$ are different integers from one to six, inclusive; two or three of the dashed lines represent non-allenic double bonds; and $R_1$, $R_2$, $R_3$, $R_4$, $R_5$, $R_6$, $R_7$, and $R_8$ are hydrogen or lower alkyl. When alkyl groups are present in these tricyclic pyrazines or tricyclic dihydropyrazines, they are preferably lower alkyl having from one to three carbon atoms.

The tricyclic pyrazines prepared according to the present invention can be obtained by a number of reaction routes, as by reacting a 1,2-diaminocycloalkane or monoalkyl- or polyalkyl-substituted 1,2-diaminocycloalkane with a 1,2-cycloalkanedione or monoalkyl- or polyalkyl-substituted derivatives thereof under ring-closing conditions or by reacting such 1,2-diaminocycloalkanes or derivatives with a 1,2-cycloalkanedione or monoalkyl- or polyalkyl-substituted derivatives thereof, followed by aromatization of the heterocyclic ring, or with a 2-halocycloalkanone or monoalkyl- or polyalkyl-substituted deriavtives thereof; or by reacting a 2-aminocycloalkanone or monoalkyl- or polyalkyl-substituted derivatives thereof with a like or a different 2-aminocycloalkanone. The reactants are preferably utilized in stoichiometric proportions. The tricyclic dihydropyrazine compounds obtained upon ring-closure are then dehydrogenated as desired to provide the fused pyrazine ring.

It will accordingly be appreciated by those skilled in the art that when 1,2-diaminocyclopentane and 1,2-cyclopentanedione are reacted, $m$ and $n$ in the generic formula will both be one, while when 1,2-cyclodecadione and 1,2-diaminocyclopentane are reacted $m$ will be six and $n$ will be one. Similar results will follow from the other reactions set forth above utilizing reactants having from five to ten carbon atoms in each ring.

The reaction can accordingly be represented as one between a cyclic ketone having the formula

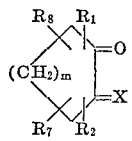

and a cyclic amine having the formula

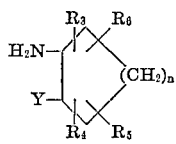

wherein $m$ and $n$ are as set forth above; X is an amino group, a halo atom, preferably bromo or chloro, or a carbonyl oxygen; and Y is an amino group or a carbonyl oxygen; except that X and Y cannot both be amino or both be carbonyl oxygen and X cannot be a halo atom when Y is carbonyl oxygen; and wherein $R_1$, $R_2$, $R_3$, $R_4$, $R_5$, $R_6$, $R_7$ and $R_8$ are the same or different and are hydrogen or lower alkyl. Thus, X and Y taken together is one of the following pairs of groups:

| X | Y |
|---|---|
| (1) Carbonyl oxygen | Amino. |
| (2) Halo atom | Do. |
| (3) Amino | Halo atom. |
| (4) Amino | Carbonyl oxygen. |

Examples of the 1,2-diaminocycloalkanes which can be used herein are:

1,2-diaminocyclopentane
1,2-diaminocyclohexane;
1,2-diamino-4,5-dimethylcyclohexane;
1,2-diamino-3,3,5,5-tetramethylcyclohexane;
1,2-diamino-3,4,4-triethylcyclohexane;
1,2-diamino-3,3-dimethyl-4,4-diethylcyclohexane;
1,2-diaminocycloheptane,
1,2-diamino-5-methylcycloheptane;
1,2-diamino-3,3,5,5-tetramethylcyclohexane;
1,2-diamino-3,3-dimethyl-5,5-diethylcycloheptane;
1,2-diamino-3,7-dimethylcyclodecane; and
1,2-diamino-3-methylcyclopentane.

Examples of the 2-halo-cycloalkanones are:

2-chlorocyclohexanone;
2-bromocyclohexanone;
2-chloro-3,4-dimethylcyclohexanone;
2-chloro-3,3,5,5-tetramethylcyclohexanone;
2-bromocycloheptanone;
2-bromo-3,4,5-triethylcycloheptanone;
2-bromo-3,4,5,6-tetramethylcycloheptanone; and
2-chloro-5-methylcyclodecanone Examples of the 1,2-cycloalkadiones capable of being utilized herein are:

3-methyl-1,2-cyclopentadione;
1,2-cyclodecadione;
4,4-dimethyl-1,2-cyclodecadione;
3,7-diethyl-1,2-cyclononadione;
3,4,5-trimethyl-7-ethyl-1,2-cyclononadione;
1,2-cyclonondione;
1,2-cyclooctadione;
3-methyl-1,2-cyclohexadione;
4-methyl-1,2-cycloheptadione;
1,2-cycloheptadione; and
1,2-cyclopentadione.

Examples of amino cycloalkanones capable of being utilized herein are:

2-aminocyclopentanone-1;
2-aminocyclohexanone-1;
2-aminocycloheptanone-1;
2-aminocyclooctanone-1;
2-aminocyclodecanone-1;
2-amino-4-methylcyclononanone-1;
2-amino-3,3-dimethylcyclopentanone-1; and
2-amino-3-methyl-4-ethylcyclohexanone-1.

The reaction of the diamine and diketone is carried out at a temperature of from 0° C. At temperatures lower than 0° C., the reaction rate is relatively slow, while at temperatures higher than about 100° C., the reactants tend to polymerize. It is preferred to carry the reaction out at temperatures of from 70° C. to 85° C. The time for the reaction to form the tricyclic pyrazine is from about one hour up to eight hours. It is desirable to conduct the reaction so that the time required is from about two to about four hours.

In order to promote a more uniform reaction by moderating the rate and providing good mixing and to facilitate removal by azeotropic distillation of the water formed in the reaction, it is desirable in some aspects of the invention to utilize a liquid reaction vehicle. The vehicle is desirably a solvent for the reactants and any other ingredients which are present in the reaction mixture and forms an azeotrope with water. The vehicle can also be chosen so that the reflux temperature of the reaction mixture is within the temperature ranges as hereinbefore set forth. Thus, the preferred reaction vehicles utilized at reaction temperatures above 15° C. include aromatic hydrocarbons such as benzene, toluene, xylene, and the like. Vehicles which can be utilized at lower reaction temperatures of 0° to 10°–15° C. include aliphatic alcohols such as methanol, ethanol, isopropanol, and the like and aliphatic and alicyclic ethers such as tetrahydrofuran, diethyl ether, and the like. It will be understood that the alcohols can also be used at temperatures of 15° C. and above.

The reaction is desirably carried out in the presence of a catalyst to promote the ring-closing reaction and form the reduced pyrazine ring. The catalysts are generally acid substances, particularly aryl sulfonic acids such as paratoluene sulfonic acid and the like. Based upon the quantity of reactants, it is desirable to use from about 0.5 to about five percent of such catalysts. All parts, proportions, percentages, and ratios herein are by weight unless otherwise indicated.

After the formation of the reduced tricyclic pyrazine, it is oxidized to provide the corresponding pyrazine derivative. This is carried out at an alkaline pH obtained by adding a strong alkali metal hydroxide or an equivalent material such as alkali metal carbonate. The hydroxides of sodium or potassium are desirably used.

The hydroxide-containing mixture is then treated with oxygen at a temperature of from 30° to 70° C. to provide a satisfacory reaction rate while minimizing undesirable side reactions and the ebullition of the reactants. The oxygen can be pure or can contain inert diluents. Air can be used as the oxygen source.

The oxygen is added to the reactants by sparging or otherwise bubbling the gas through the reaction mixture. At the temperatures used herein, the times for the reaction range from about 30 minutes to 24 hours, and it is desirable to carry out the reaction so that it attains a high degree of completion in from about one to five hours.

The oxidation reaction is desirably carried out in an inert reaction vehicle to reduce polymer formation, to permit better control over the reaction temperature, and to improve mixing of the reactants. The preferred inert reaction vehicles are solvents and include alkanols, preferably lower alkanols such as methanol, ethanol and the like.

After the reaction is complete, as readily determined by gas chromatography, the pH of the reaction mixture can, if desired, be reduced by the addition of an acid, desirably a strong mineral acid such as dilute sulfuric acid, preferably 10% to 50% sulfuric acid. If any undissolved hydroxide exists at this point then it is preferred that it be removed, as by centrifugation or filtration. The crude tricyclic pyrazine is then stripped of vehicle and further purified as desired according to the procedures hereinafter described.

It will be understood by those skilled in the art that the intermediate and the final products prepared herein are washed and dried to obtain the desired substances. The novel tricyclic pyrazines can be obtained in purer form or in substantially pure form by conventional purification techniques. Thus, the products can be purified and/or isolated by distillation, extraction, crystallization, preparative chromatographic techniques, and the like. It has been found desirable to purify the tricyclic pyrazines by fractional distillation under vacuum.

It will be appreciated from the present disclosure that the tricyclic pyrazines and mixtures thereof according to the present invention can be used to alter, vary, fortify, modify, enhance, or otherwise improve the flavor of a wide variety of materials which are ingested, consumed, or otherwise organoleptically sensed.

The term "alter" in its various forms will be understood herein to mean the supplying or imparting a flavor character or note to an otherwise bland, relatively tasteless substance, or augmenting an existing flavor characteristic where the natural flavor is deficient in some regard, or supplementing the existing flavor impression to modify organoleptic character.

Such pyrazines are accordingly useful in flavoring compositions. A flavoring composition is taken to mean one which contributes a part of the overall flavor impression by supplementing or fortifying a natural or artificial flavor in a material or one which supplies substantially all the flavor and/or aroma character to a consumable article.

The term "foodstuff" as used herein includes both solid and liquid ingestible materials for man or animals, which materials usually do, but need not, have nutritional value. Thus, foodstuffs includes meats, gravies, soups, convenience foods, malt, alcoholic, and other beverages, milk and dairy products, seafoods including fish, crustaceans, mollusks, and the like, candies, vegetables, cereals, soft drinks, snacks, dog and cat foods, other veterinary products, and the like.

The term "tobacco" will be understood herein to mean natural products such as, for example, burley, Turkish tobacco, Maryland tobacco, flue-cured tobacco and the like including tobacco-like or tobacco-based products such as reconstituted or homogenized leaf and the like, as well as tobacco substitutes intended to replace natural tobacco, such as lettuce and cabbage leaves and the like. The tobaccos and tobacco products include those designed or used for smoking such as in cigarette, cigar, and pipe tobacco, as well as products such as snuff, chewing tobacco, and the like.

When the tricyclic pyrazines of this invention are used in a flavoring composition, they can be combined with conventional flavoring materials or adjuvants. Such co-ingredients or flavoring adjuvants are well known in the art for such use and have been extensively described in the literature. Apart from the requirement that any such adjuvant material be ingestibly acceptable, and thus non-toxic or otherwise non-deleterious, conventional materials can be used and broadly include other flavor materials, vehicles, stabilizers, thickeners, surface active agents, conditioners, and flavor intensifiers.

Such conventional flavoring materials include saturated, unsaturated, and amino acids; alcohols, including primary and secondary alcohols; esters; carbonyl compounds including ketones and aldehydes; lactones; other cyclic organic materials including benzene derivatives, alicyclics, heterocyclics such as furans, pyridines, other pyrazines and the like; sulfur-containing materials including thiols, sulfides, disulfides and the like; proteins; lipids; carbohydrates; so-called flavor potentiators such as monosodium glutamate, guanylates, and inosinates; natural flavoring materials such as cocoa, vanilla, and caramel; essential oils and extracts such as anise oil; clove oil, and the like; artificial flavoring materials such as vanillin; and the like.

Stabilizers include preservatives such as sodium chloride, and the like, antioxidants such as calcium and sodium ascorbate, ascorbic acid, butylated hydroxyanisole, butylated hydroxytoluene, propyl gallate and the like, sequestrants such as citric acid, EDTA, phosphates, and the like.

Thickeners include carriers, binders, protective colloids, suspending agents, emulsifiers and the like, such as agar-agar, carrageenan, cellulose and cellulose derivatives such as carboxymethyl cellulose and methyl cellulose, natural and synthetic gum such as gum arabic, gum tragacanth, and the like, and other proteinaceous materials, lipids, carbohydrates, starches, and pectins.

Surface active agents include emulsifying agents such as mono- and/or diglycerides of fatty acids such as capric acid, caprylic acid, palmitic acid, myristic acid, stearic acid, oleic acid, and the like, lecithin, defoaming and flavor-dispersing agents such as sorbitan monostearate, potassium stearate, hydrogenated tallow alcohol, and the like.

Conditioners include compounds such as bleaching and maturing agents such as benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents such as sodium acetate, ammonium bicarbonate, ammonium phosphate, citric acid, lactic acid, vinegar and the like; colorants such as carminic acid, cochineal, turmeric, curcumin and the like; firming agents such as aluminum sodium sulfate, calcium chloride and calcium gluconate; texturizers; anti-caking agents such as aluminum calcium sulfate and tribasic calcium phosphate; enzymes; yeast foods such as calcium lactate and calcium sulfate; nutrient supplements such as iron salts such as ferric pyrophosphate, ferrous gluconate and the like, riboflavin, vitamins, zinc sources such as zinc chloride, zinc sulfate, and the like.

The tricyclic pyrazines, or the compositions incorporating them, as mentioned above, can be combined with one or more vehicles or carriers for adding them to the particular product. Vehicles can be edible or otherwise suitable materials such as ethyl alcohol, propylene glycol, water, and the like. Carriers include materials such as gum arabic, carrageenan, other gums, and the like. The tricyclic pyrazines can be incorporated with the carriers by conventional means such as spray-drying, drum-drying, and the like. Such carriers can also include materials for coacervating the pyrazines (and other flavoring ingredients, as present) to provide encapsulated products. When the carrier is an emulsion, the flavoring composition can also contain emulsifiers such as mono- and diglycerides of fatty acids and the like. With these carriers or vehicles the desired physical form of the composition can be prepared.

It will be understood by those skilled in the art that the tricyclic pyrazines can be added during production of the finished product. Thus, when the pyrazines are used to alter or otherwise vary the flavor of a foodstuff, they can be added in the original mixture, dough, emulsion, batter, or the like prior to any cooking or heating operation. Alternatively, they can be added at a later stage of processing if volatilization losses would be excessive during the earlier processing.

When the materials are used to treat tobacco products, for example, the additive can be applied in a suitable manner, as by spraying, dipping, or otherwise. The pyrazines can be applied during the "casing" or final spray treatment of the tobacco, or they can be applied at some earlier stage of curing or preparation. The quantity of pyrazines or mixtures thereof utilized should be sufficient to impart the desired flavor characteristic to the product, but on the other hand, the use of an excessive amount of the pyrazines is not only wasteful and uneconomical but in some instances too large a quantity may unbalance the flavor or other organoleptic property of the product consumed. The quantity used will vary depending upon the ultimate foodstuff, tobacco product, or other consumable product; the amount and type of flavor initially present in the product; the further process or treatment steps to which the product will be subjected; regional and other preference factors; the type of storage, if any, to which the product will be subjected; and the pre-consumption treatment, such as baking, frying, and so on, given to the product by the ultimate consumer. Accordingly, the terminology "effective amount" and "sufficient amount" is understood in the context of the present invention to be quantitatively adequate to alter the flavor of the foodstuff, tobacco, or other consumable material.

It is preferred that the ultimate compositions contain from about 0.1 part per million (p.p.m.) to about 100 p.p.m. of tricyclic pyrazines. More particularly, in food compositions it is desirable to use from about 0.1 to about 50 p.p.m. and in certain preferred embodiments of the invention, from about 1 to about 15 p.p.m. of the pyrazines are included in the finished product. On the other hand, tobacco compositions can contain as little as 0.1 p.p.m. and as much as 100 p.p.m., depending upon whether a cigarette tobacco, a pipe tobacco, a cigar tobacco, a chewing tobacco, or snuff is being prepared.

The amount of tricyclic pyrazine or pyrazines to be utilized in the flavoring composition can be varied over a wide range depending upon a particular quality to be added to the foodstuff, tobacco, or other consumable material. Thus, amounts of one or more tricyclic pyrazines according to the present invention from about 0.1 percent up to 80 or 90 percent can be incorporated in such compositions. It is generally found to be desirable to include from about 0.5 to about 25% of the tricyclic pyrazines in such compositions.

The tricyclic pyrazines of this invention are also useful individually or in admixtures as fragrances.

They can be used to contribute a fatty, nut-like aroma. As olfactory agents the tricyclic pyrazines of this invention can be formulated into or used as components of a "perfume composition."

The term "perform composition" is used herein to mean a mixture of organic compounds, including, for example, alcohols, aldehydes, ketones, nitriles, esters, and frequently hydrocarbons which are admixed so that the combined odors of the individual components produce a pleasant or desired fragrance. Such perfume compositions usually contain: (a) the main note or the "bouquet" or foundation-stone of the composition; (b) modifiers which round-off and accompany the main note; (c) fixatives which include odorous substances which lend a particular note to the perfume throughout all stages of evaporation, and substances which retard evaporation; and (d) top-notes which are usually low-boiling fresh smelling materials.

In perfume compositions the individual component will contribute its particular olfactory characteristics, but the overall effect of the perfume composition will be the sum of the effect of each ingredient. Thus, the individual compounds of this invention, or mixtures thereof, can be used to alter the aroma characteristics of a perfume composition, for example, by high-lighting or moderating the olfactory reaction contributed by another ingredient in the composition.

The amount of the compounds of this invention which will be effective in perfume compositions depends on many factors, including the other ingredients, their amounts, and the effects which are desired. It has been found that perfume compositions containing as little as 2% of the tricyclic pyrazines of this invention, or even less, can be used to impart a scent to or alter the scent of soaps, cosmetics, and the other products. The amount employed can range up to 50% or higher and will depend on considerations of cost, nature of the end product, the effect desired on the finished product and particular fragrance sought.

The tricyclic pyrazines of this invention can be used alone or in a perfume composition as an olfactory component in detergents and soaps; space odorants and deodorants; perfumes; colognes; toilet waters; bath preparations such as bath oil and bath salts; hair preparations such as lacquers, brilliantines, pomades, and shampoos; cosmetic preparations such as creams, deodorants, hand lotions, and sun screens; powders such as talcs, dusting powders, face powder, and the like. When used as an olfactory component of a perfumed article, as little as 0.01% of one or more of the tricyclic pyrazines will suffice to impart a nut-like or honey odor. Generally, no more than 0.5 percent is required.

In addition, the perfume composition can contain a vehicle or carrier for the tricyclic pyrazines alone or with other ingredients. The vehicle can be a liquid such as alcohol, glycol, or the like. The carrier can be an absorbent solid such as a gum or components for encapsulating the composition.

The following examples are given to illustrate embodiments of the invention as it is presently preferred to practice it. It will be understood that these examples are illustrative, and the invention is not to be considered as restricted thereto except as indicated in the appended claims.

Example I.—Preparation of 1-methyl-2,3,5,6,7,8-hexahydro-1(H)-cyclopenta[b]quinoxaline A three-liter flask equipped with condenser, stirrer, heater, and Bidwell trap, is charged with the following ingredients.

Ingredients:                                                        Amount
    Cyclotene (3 - methyl - 1,2, - cyclopentanedione) _____ g__ 34.8
    1,2 - diaminocyclohexane _____ g__ 34.2
    p-Toluene sulfonic acid _____ g__ 2
    Anhydrous benzene _____liters__ 1.5

The mixture is refluxed at atmospheric pressure for three hours, during which time 12 ml. of water is collected in the Bidwell trap. The reaction mass is then cooled and the benzene is stripped off at reduced pressure. The 53 grams of solid residue material is then sublimed to obtain 29 grams of 1-methyl-3,4a,5,6,7,8,8a,9-octahydro - 2(H) - cyclopenta[b]quinoxaline having the structure:

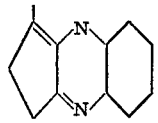

The structure is confirmed by proton magnetic resonance (PMR) analysis.

Ten grams of the material produced above is charged to a one-liter flask, together with 38 ml. of ethanol and 2 g. of solid potassium hydroxide. The reaction mixture is cooled to 20° C., and oxygen is bubbled into the mixture for one hour. The oxygen-saturated reaction mass is then heated to 50° C., and oxygen is again bubbled in for another hour, while the reaction mass is maintained at 50° C.

The reaction mass is cooled, the ethanol is stripped off at reduced pressure, and the residue is then extracted with four 150 ml. volumes of ether and washed with 100 ml. of saturated sodium chloride solution.

The ether extract is dried over anhydrous magnesium sulfate and the dried solution is stripped of ether.

The resulting solid material has a nut-like aroma and the following structure:

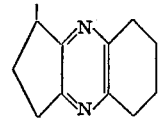

As confirmed by PMR and mass spectral analysis.

Example II.—Preparation of 1,2,3,4,6,7,8,9-octahydrophenazine

A two-liter flask equipped with condenser, stirrer, and Bidwell trap is charged with the following ingredients:

Ingredient:                                                         Amount
    Cyclohexane-1,2-dione _____ g__ 9.65
    1,2-diaminocyclohexane _____ g__ 11.4
    P-toluene sulfonic acid _____ g__ 1.0
    Benzene, anhydrous _____liter__ 1

The reaction mass is heated at reflux for two hours until 3.6 ml. of water is collected in the Bidwell trap. The reaction mass is thereupon cooled, and the benzene is stripped from the reaction mass at reduced pressure to obtain 15 grams of 1,2,3,4,4a,6,7,8,9,10a-decahydrophenazine having the structure:

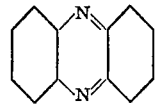

This structure is confirmed by PMR and infrared (IR) analyses.

A one-liter flask is charged with 15 g. of the decahydrophenazine dissolved in 300 ml. of 95% ethanol, 4 g. of potassium hydroxide is added, and oxygen is bubbled into the reaction mass for one hour at −20° C. and then for one hour at 50° C. The reaction mass is cooled, dissolved in water, and extracted with diethyl ether. The ether extract is evaporated and the residue is dissolved in 160 ml. of 95% ethanol. Six grams of potassium hydroxide are added to the alcoholic solution and the mixture is refluxed for four hours whereafter the mixture is cooled and the ethanol is stripped off to provide a white solid. This solid is extracted with three 150 ml. volumes of diethyl ether, and the ether extract is washed with the saturated sodium chloride solution. The ether extract is dried over anhydrous magnesium sulfate and stripped of ether. The resulting 4 g. is distilled at a temperature in the range of 125°–130° C. and a pressure of 2.0–2.5 mm. Hg. NMR, IR and mass spectral analysis confirm the structure:

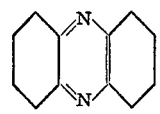

The yellowish viscous liquid has the taste of fried corn chips at a level of 5 p.p.m.

Example III.—Preparation of 1,2,3,4,6,7,8,9,10,11,12,13-dodecahydrocyclodeca-[b]quinoxaline A 2-liter reaction vessel equipped with stirrer, reflux condenser, and Bidwill trap is charged with:

Ingredient:                                                         Amount
    Cyclodecane-1,2-dione _____ g__ 10
    1,2-diaminocyclohexane _____ g__ 6.6
    P-toluene sulfonic acid _____ g__ 1.5
    Benzene, anhydrous _____liter__ 1

The mixture is refluxed for two hours until 2.5 ml. of water is collected in the Bidwell trap. The reaction mass is then cooled and the benzene stripped off to yield 21 g. of a solid residue. This material is determined by mass spectral analysis and PMR to be the reduced pyrazine having the structure:

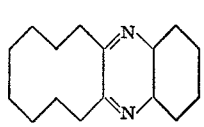

The 21 grams of solid are dissolved in 250 ml. of ethanol in a 1-liter flask, 6 grams of potassium hydroxide is added, and the reaction mixture is refluxed for three hours and then cooled. The ethanol is stripped off and the residue dissolved in 100 ml. of saturated sodium chloride solution. The sodium chloride solution is extracted four times with 150 ml. portions of ether. The extracts are combined and then dried over anhydrous magnesium sulfate. The dried ether extract is stripped of ether. The resulting 21 g. of residue is distilled at a temperature in a range of 160–166° C. at 2 mm. Hg. PMR, IR and mass spectral analysis shows that the material is 1,2,3,4,6,7,8,9,10,11,12,13-dodecahydrocyclodeca[b]quinoxaline having the structure:

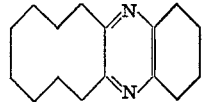

This material has a light, sweet, nut character.

Example IV

A basic cocoa flavor material is prepared by admixing the following materials:

| Ingredient: | Amount |
|---|---|
| Acetaldehyde | 20.0 |
| Isobutyraldehyde | 16.0 |
| Isovaleraldehyde | 40.0 |
| Methyl sulfide | 0.35 |
| Methyl disulfide | 0.44 |
| Isobutyl acetate | 0.12 |
| Isoamyl acetate | 0.20 |
| Phenylethyl acetate | 0.59 |
| Diacetyl | 0.02 |
| Acetophenone | 1.00 |
| Furfural (50%) | 0.06 |
| Benzaldehyde | 1.00 |
| Phenylacetaldehyde | 0.58 |
| Isoamyl alcohol | 0.18 |
| Phenylethyl alcohol | 3.50 |
| $\gamma$-Butyrolactone | 0.13 |
| | 84.17 |

A nut-like flavor note material is prepared by combining the following ingredients as shown:

| Ingredient: | Amount (parts) |
|---|---|
| Material produced in Example I | 11.0 |
| Material produced in Example II | 27.0 |
| Material produced in Example III | 20.0 |
| | 58.0 |

A first flavor composition is prepared by a 1.2% dilution of the basic cocoa flavor in propylene glycol/ethyl alcohol (v./v. 80/20). Vanillin is added in the ratio of 250 mg. per kilogram of solution. A second flavor composition is prepared by a 2% dilution of the basic cocoa flavor combined with the nut-like flavor note material (weight ratio 84.2:58.0) in propylene glycol/ethyl alcohol (v./v. 80/20). Vanillin is added in the ratio of 250 mg. per kilogram of liquid.

The combined flavor (2% dilution) thus prepared is found to have an excellent cocoa flavor and aroma note, whereas the flavor without the tricyclic pyrazines of this invention lacks the desirable nut-like flavor note.

Example V

The pyrazine-containing flavor note material of Example IV is added to a commercially available chocolate flavored dessert containing skim milk, sugar, non-fat dry milk solids, and cocoa with a bland, this cocoa flavor. The addition of 63 mg./kg. increases the nut-like note to a desirable level and improves the overall flavor.

It will be appreciated from this disclosure that other-alkyl-substituted and unsubstituted tricyclic pyrazines can be used in lieu of or addition to the materials shown above with favorable results.

Example VI

A flavor composition according to this invention is prepared by combining the following materials as shown:

| Compound: | Amount (grams) |
|---|---|
| Tricyclic pyrazine of Example I | 6 |
| Tricyclic pyrazine of Example II | 15 |
| Tricyclic pyrazine of Example III | 12 |

This tricyclic pyrazine composition is added to a chocolate milk having a bland, thin cocoa flavor. Adding 30 mg./kg. increases the nut-like note, and supplemental addition of 40 mg./kg. of the basic cocoa flavor material as described in Example IV gives the chocolate milk an excellent cocoa flavor and aroma note.

Example VII

A commercial cocoa mix is used to prepare two different batches of beverage. The first batch is evaluated without any further additive, while the material of Example I is added to the second batch in the ratio of 40 mg. of the tricyclic pyrazine to each kilogram of cocoa beverage. The beverage without tricyclic pyrazine gives a rather harsh flavor impression, while the beverage containing tricyclic pyrazine according to the present invention has a fuller, richer cocoa flavor.

Example VIII

The aroma provided by the 1,2,3,4,6,7,8,9-octahydrophenazine (as produced in Example II) in the composition set forth below is important to the "natural" undertone quality of the certain floral absolutes such as Hyacinth and Narcissus. The formulation is as follows:

| Ingredient: | Amount |
|---|---|
| Phenylacetylaldehyde | 150 |
| Tolubalsamol | 50 |
| Phenylethylalcohol | 150 |
| Cinnamyl alcohol from Styrax | 200 |
| Hydroxycitronellal | 80 |
| Heliotropin | 50 |
| Terpineol | 30 |
| Petitgrain bigarade | 40 |
| Benzylacetate over Jasmin | 150 |
| Benzylacetate, extra | 100 |
| Benzylbutyrate | 10 |
| Linalool, extra | 100 |
| Hyacinth absolute | 10 |
| Benzylacetate | 10 |
| Cinnamylacetate | 30 |
| Phenylethylacetate | 20 |
| $\alpha$-Ionone | 20 |
| Isoeugenol, extra | 5 |
| Jasmin absolute | 10 |
| Rose de Mai absolute | 10 |
| Neroli, extra | 10 |
| $\gamma$-n-Methylionone | 15 |
| Phenylethylalcohol | 120 |
| Jasmin chassis absolute | 5 |
| Eugenol | 3 |
| 1,2,3,4,6,7,8,9-octahydrophenazine | 1 |

The addition of the 1,2,3,4,6,7,8,9-octahydrophenazine lends an authentic, earthy, dank character bringing the composition closer to the odor of pure Hyacinth absolute.

Example IX

A perfume composition is prepared by admixing the following ingredients:

| Ingredient: | Amount |
|---|---|
| Guaiac wood oil | 40 |
| 8,9-epoxycedrane | 20 |
| Octahydro - 3,6,8,8 - tetramethyl-1H-3a,7-methanoazulen-6-yl ketone (Cedryl methyl ketone ) | 6 |
| Methyl - 3,6,7,8 - tetramethyl - 1H,3a,7-methanoazulen-6-yl ketone (Cedry methyl ketone) | 6 |
| Ortho-t-butylcyclohexanol | 3 |
| 1,2,3,4,6,7,8,9 - octahydrophenazine (10% solution in 95% ethanol) | 1 |

The small amount of 1,2,3,4,6,7,8,9-octahydrophenazine significantly improves the total effect of the fragrance, imparting the necessary rooty, potato-like nutty character to the mixture of the other woody materials.

What is claimed is:

1. A chemical compound having the formula:

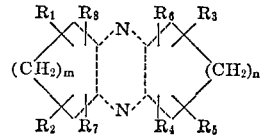

wherein two or three of the dashed lines represent non-allenic double bonds; $m$ and $n$ are different integers from one to six, inclusive, and the sum of $m$ and $n$ is not greater than eight; and $R_1$, $R_2$, $R_3$, $R_4$, $R_5$, $R_6$, $R_7$ and $R_8$ are hydrogen or lower alkyl.

2. A tricyclic pyrazine according to claim 1 wherein there are three double bonds in the heterocyclic ring; $m$ is one; $n$ is two; $R_1$ is a methyl substituent on a carbon atom adjacent to the heterocyclic ring; and $R_2$, $R_3$, $R_4$, $R_5$, $R_6$, $R_7$, and $R_8$ are hydrogen.

3. A tricyclic pyrazine according to claim 1 wherein there are three double bonds in the heterocyclic ring; $m$ is six; $n$ is two; and $R_1$, $R_2$, $R_3$, $R_4$, $R_5$, $R_6$, $R_7$, and $R_8$ are hydrogen.

References Cited

UNITED STATES PATENTS

| | | | |
|---|---|---|---|
| 3,453,365 | 7/1969 | Lane et al. | 260—250 R |
| 3,471,492 | 10/1969 | Johnston | 260—250 R |

NICHOLAS S. RIZZO, Primary Examiner

U.S. Cl. X.R.

99—140, 24, 26; 131—17

PO-1050
(5/69)

IFF 2164

UNITED STATES PATENT OFFICE
CERTIFICATE OF CORRECTION

Patent No. 3,705,121      Dated 12/5/72

Inventor(s) ALAN O. PITTET et al

It is certified that error appears in the above-identified patent and that said Letters Patent are hereby corrected as shown below:

Col. 2, line 7, correct the spelling of "hydrocarbon"

Col. 2, line 18, after "4" and before "6" cancel --5--.

Col. 11, line 53, change "this" to --thin--.

Col. 12, line 58, strike "(cedryl methyl ketone)-6"

and insert in lieu thereof --(cedrenol)...20--

Signed and sealed this 8th day of May 1973.

(SEAL)
Attest:

EDWARD M. FLETCHER, JR.
Attesting Officer

ROBERT GOTTSCHALK
Commissioner of Patents